United States Patent [19]
Lovendahl

[11] 3,747,179
[45] July 24, 1973

[54] TOOL HOLDER ARRANGEMENT

[76] Inventor: Norman H. Lovendahl, 814 N. Clinton, River Forest, Ill. 60305

[22] Filed: May 26, 1971

[21] Appl. No.: 147,025

[52] U.S. Cl. .................................................. 29/96
[51] Int. Cl. ............................................. B26d 1/00
[58] Field of Search ................................ 29/95, 96

[56] References Cited
UNITED STATES PATENTS

| | | | |
|---|---|---|---|
| 3,354,526 | 11/1967 | Erkfritz | 29/96 |
| 2,598,581 | 5/1952 | McKenna et al. | 29/96 R |
| 3,341,920 | 9/1967 | Kelm | 29/96 |
| 3,310,859 | 3/1967 | Diemond et al. | 29/96 |

Primary Examiner—Leonidas Vlachos
Attorney—Alter, Weiss & Whitesel

[57] ABSTRACT

A clamp screw arrangement for securing an apertured cutting bit to a tool holder. The arrangement simultaneously clamps the bit against the bed and lateral shoulder means contiguous to the bed. Further, the arrangement applies holding pressure around the entire peirphery of the aperture in the tool bit to assure that the tool bit is not forced from the bed during cutting operations using the tool.

7 Claims, 4 Drawing Figures

PATENTED JUL 24 1973 3,747,179

(a)

(b)

(c)

INVENTOR
NORMAN H. LOVENDAHL

BY
Alter, Weiss and Whitesel
ATTORNEYS

TOOL HOLDER ARRANGEMENT

This invention relates generally to tool holders for use with machine tools, and more particularly concerns a novel tool holder arrangement incorporating clamp screw means for holding the cutting bits or inserts in such tool holders.

In the early days of the machine tool industry, cutting inserts were not employed; instead, an entire shank was made up of the tool cutting material. This, is of course, proved inefficient and expensive, not only because of the high cost of the tools, but also because of the brittleness of the tools and the necessity of using different shanks for different jobs.

To overcome these difficulties, the use of a separate tool bit or insert on the shank was instituted. One of the original ways used to attach the insert to the holder was by welding. This improved arrangement also had obvious disadvantages. For example, as the cost of skilled labor increased, the welding operation became increasingly costly. In addition, welding the cutting inserts onto the tool holder provided a permanent attachment and consequently failed to realize the versatility which is obtainable when using a separate cutting insert with a tool holding clamp.

To provide the desired versatility, exterior clamp arrangements were utilized to secure the cutting insert to the tool holder. The clamping arrangements were notable improvements over the previous tools and tool holding arrangements practiced by the machine tool industry. Nonetheless, the exterior clamping arrangements failed to provide an ideal tool and tool holder combination. Difficulties were still encountered in that, among other things, the clamps were clumsy, unwieldy and interferred with the chip flow.

The exterior clamping arrangements were therefore replaced in many instances with clamp screw arrangements. With the clamp screw arrangement, the cutting insert is generally counter sunk to receive a flat head clamp screw to eliminate chip flow interference. This type of arrangement is shown particularly in U. S. Pat. No. 1,964,786. Other clamp screw arrangements are shown in U. S. Pat. Nos. 3,341,919 and 3,334,920.

Difficulties encountered in these different clamp screw arrangements include the failure of the clamp screw to simultaneously force the tool bit against both the bed and the shoulder; and the failure to apply pressure around the entire peripheral or circumferential edge of the tool bit aperture.

The failure to simultaneously force the tool bit against the bed and shoulder leads to improperly seated tool bits, which of course damages the material and the bit as well as requires turning off the machine and reinserting another tool bit.

Accordingly, it is an object of this invention to provide inexpensive tool holders that avoid the adversities regularly encountered by known tool holders.

The failure to apply pressure around the entire peripheral edge of the tool bit aperture results in the tool bits being forced from the tool holder during the cutting operation. Once again, this failure damages parts in process, the tool bit and necessitates delay.

A related object of this invention is to provide tool holder arrangements wherein the cutting insert can be easily removed and replaced, and wherein the cutting insert is properly secured and seated due to pressure being simultaneously applied against both the shoulder and the bed of the tool holder by pressure applied around the entire periphery of the aperture of the tool holder.

In accordance with one aspect of the invention, a tool holder arrangement is provided wherein a tool shank is truncated at one end to provide a furcated abutment surface or shoulder normal to the bed. A threaded aperture extends from the top of the surface of the bed to the bottom of the tool holder beneath the surface. The axis of the threaded aperture is closer to the abutment surfaces than is the axis of the aperture of the tool bit, when the tool bit is seated with its side contiguous to the abutment surfaces.

A unique clamping screw threads into the aperture. The screw is threaded for approximately one-half its length. The unthreaded half of the screw is machined to remove the screw threads along with some of the body thereby leaving a relatively narrow neck section. A head is provided at the top of the neck section. The head is bevelled to form an inverted truncated cone section that minimizes the protrusion of the clamp screw above the tool bit insert.

The diameter of the threads of the clamping screw is smaller than the diameter of the threads of the threaded aperture in the bed of the tool. Thus, the clamp screw fits loosely or floats in the threaded aperture, which enables the inverted truncated conical portion of the screw to center itself in the tool bit aperture by forcing the tool bit against the abutment surfaces. The head section fits into but not through the aperture of the insert, which incidentally may be chamfered in the tool bit and exerts a pressure around the entire circumference of the aperture.

The closer proximity of the threaded hole in the tool holder to the abutment surfaces as compared to the axis of the tool bit aperture forces the tool bit side against the abutment surface. At the same time, the force of the screw head pressure in the downward direction normal to the top surface of the bed of the tool holder secures the tool bit insert against the top surface of the bed. Thus, the tool bit is securely positioned and located on the tool holder and maintained therein during the operations of the tool. The low profile of the tool clamp minimizes any adverse affects of the chips against the tool clamp screw.

The foregoing and other objects and advantages of this invention, and the manner of obtaining them will become more apparent, and the invention itself will be best understood by reference to the following description of embodiments of the invention taken in conjunction with the accompanying drawings, wherein.

Figure 2:
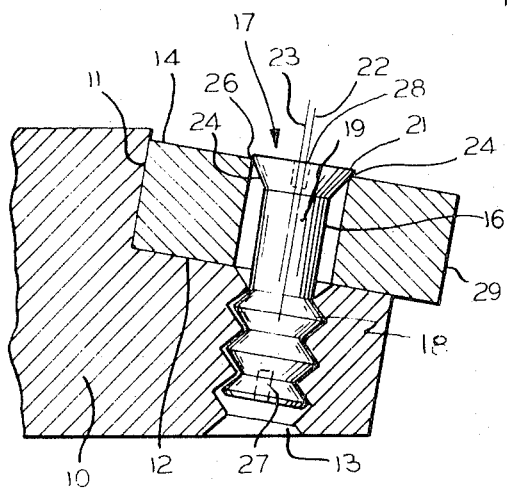
FIG. 2 is a cross sectional view of a tool holder of FIG. 1.
Figure 3:
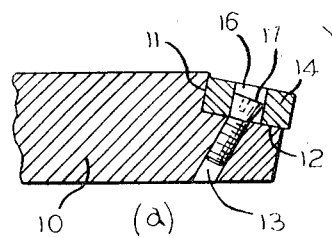
Figure 3:
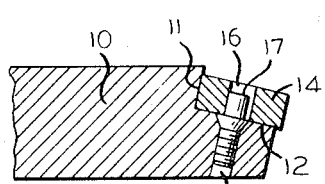
Figure 3:
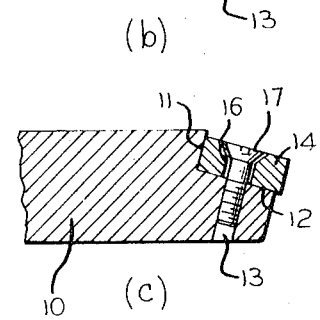
Figure 4:
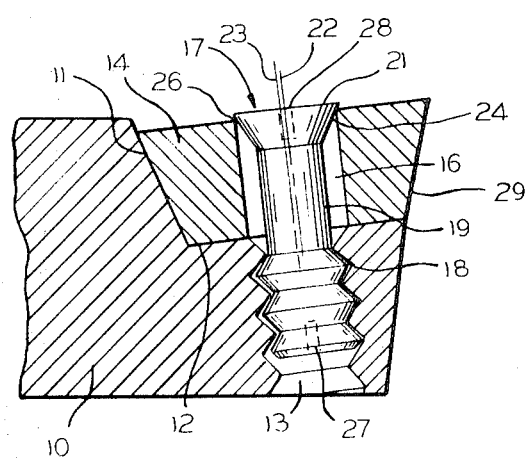

FIG. 3 at a, b and c show prior art tool holder arrangements to better explain the advantages of the present tool holder; and FIG. 4 is a cross sectional view of the tool holder similar to that shown in FIG. 2 except showing the tool holder having a positive rake.

In the drawings and description that follows, the same numerical designations will be used wherever it is convenient to do so to identify the same parts shown in the different views.

Figure 1:
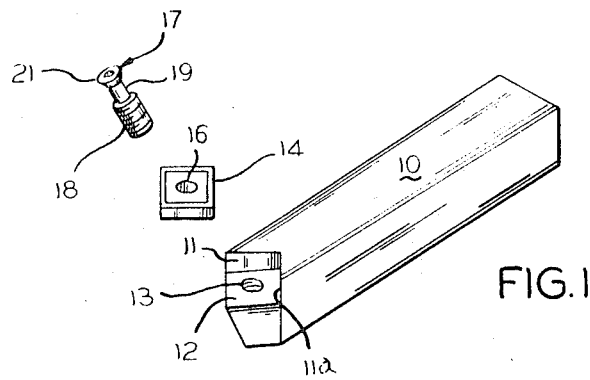
FIG. 1 is an exploded pictorial representation of the tool holder arrangement of the invention.

FIG. 1 shows a preferred embodiment of the inventive tool holder arrangement in an exploded pictorial form. A front portion of a shank or tool holder 10 is shown having one end thereof machined to provide a bed and two upstanding locating or abutment shoulders. The locating surfaces or shoulders 11, 11a are comprised of a furcated section perpendicular to the locating surface or bed 12. It should be understood that the upstanding locating surface could be comprised of a non-furcated single locating surface normal to bed 12.

The bed 12 has a threaded aperture 13 which extends through the tool holder. The axis of aperture 13 is perpendicular to bed 12.

A tool bit 14 is shown, also having an aperture 16 therein. The tool bit is held in place against surfaces 11, 11a and 12 by clamp screw 17. The clamp screw comprises a threaded section 18, a neck-like section 19 and a head section 21. The threaded and neck-like sections of the clamp screw 17 fit through aperture 16 of tool bit 14 to thread into threaded aperture 13. The head section 21 of clamp screw 17 abuts against the upper periphery of aperture 16 of the bit 14 to secure the bit 14 to the tool holder 10 in a manner such as to properly locate the bit against surfaces 11 and 12.

Means are provided to assure that the unique clamp screw 17 asserts pressures both normal to the surface 12 and normal to the surfaces 11, 11a when the clamp screw 17 is threaded into threaded aperture 13. More particularly, as shown in FIG. 2, the axis 22 of aperture 16 is at a slightly greater distance from abutment surface 11 than is the axis 23 of threaded aperture 13. The difference in the distances along with the unique shape of clamp screw 17 causes screw 17 to exert a force against insert 14 which forces insert 14 against surface 11 as clamp screw 17 is threaded into aperture 13. In addition, the shape of the head 21 which is slightly larger than aperture 16 exerts a forceful and positive downward pressure around the entire circumference of the aperture 16 to hold the tool bit 14 against surface 12. The top of the aperture 16 may be chamfered; however, it is not necessary, as can be seen in FIGS. 2 and 4.

The head 21 of clamp screw 17 comprises a portion 24 biased away from the neck out towards a topmost portion 26 of the head. Section 26 is parallel to the axis of clamp screw 17.

It should also be noted that means are provided for utilizing an Allen or hexagonal wrench either at the top or at the bottom of the clamp screw. Thus, Allen head sockets 27 and 28 are shown at the bottom and top of the clamp screw, respectively.

The effectiveness of the clamp screw arrangement taught herein is further implemented since the neck section 19 is machined down so that to remove all threads and so that as torque is applied in turning the clamp screw 17 into threaded aperture 13, the distance between axes 22 and 23 causes a torsional twist to occur at the neck 19 of the screw and thereby forcing the inverted truncated conical section against the entire circumferential periphery of aperture 16 to apply the positive downward and lateral forces holding tool bit 14 against surfaces 11 and 12; even when the front of the tool bit 29 is utilized in the cutting operations.

FIG. 3 shows some prior art arrangements which do not provide the features now provided by the arrangement shown in FIGS. 1, 2 and 4. For example, FIG. 3a shows at tool holder 10 holding a tool bit 14 utilizing a clamp screw 17 wherein the threaded aperture 13 in the tool holder 10 is at a larger angle to the bed surface as compared to the angle between axis 23 and surface 12. The configuration of FIG. 3a is such that the clamp screw applies most of its pressure against the back surface of the aperture 16 in tool bit 14. There is a downward pull but only that due to the frictional contacts between the back of the head section of clamp screw 18 which does hold the tool bit 14 against surface 12. However, because a pressure is applied only at the rear of aperture 16, the tool bit 14 has a tendency to be forcibly displaced during the cutting operation. This deficiency is overcome by the arrangement of FIGS. 1, 2 and 4.

The arrangement of FIG. 3b also suffers from the same adverse affect; that is, the tool bit has the tendency to fly out during cutting operations because the pin portion of the clamp screw 17 applies the holding force mainly at the rear portion of aperture 16. Furthermore, there is a necessity of drilling two holes in making up the tool holder and threading one of the holes off center to apply the necessary force to secure tool bit 14 against surface 11.

FIG. 3c shows a clamp screw arrangement, wherein the tool bit 14 is held and placed against surface 12 by a clamp screw 17 that threads into a threaded aperture 13 in tool holder 10 and passes through aperture 16 in tool bit 14. The force is applied circumferentially around the aperture 16 which is shown as having a countersunk portion. However, there is nothing to force surface 14 against surface 11, since the complete thrust and force obtained in threading clamp screw 17 into threaded aperture 13 is in the downward direction. Thus, while FIG. 3c shows a prior art embodiment wherein the tool bit cannot escape during machine operations; nonetheless, many times that tool bit is not properly aligned on the tool holder and not properly seated against surface 11. This causes excessive breakage of tool bits, among other things.

FIG. 4 teaches an embodiment of the tool holder of FIGS. 1 and 2 wherein a negative rake is utilized. It is shown to emphasize the fact that this invention covers positive rakes, negative rakes or flat rakes. In addition, it should be understood that the arrangement disclosed herein can also be utilized with spacers between the tool bits and the surfaces of the tool holder.

A preferred embodiment of clamp screw 17 is fabricated from 4140 steel, heat treated to a Rockwell Hardness Rc of 40 to 45. The total length of the clamp screw is eleven-sixteenth inches. The thread is ¼ 20 R.H. Std. P.D. and commences nine thirty-seconds inches from the top of the screw clamp. The head has a diameter of 0.285 inches. The neck diameter is 0.187 inches. The biased portion of the head is at a 30° angle to the center line of the screw clamp. The neck 19 starts 0.095 inches from the top of the head. There is an unbiased portion extending 0.010 inches from the top of the head.

With this particular hardness and neck dimension, the screw clamp is twisted at the neck when tightened in the threaded aperture to provide simultaneous securing forces against surfaces 11, 12 extending around the entire circumference of aperture 16.

In operation, the tool bit is placed on the bed of the tool holder that has been machined out for receiving the tool bits; that is, against surfaces such as 12 and 11 with apertures 16 and 13 generally aligned. The clamp screw 17 is then placed through aperture 16 and threaded into threaded aperture 13. It is tightened into position with a wrench, such as an Allen head wrench. In tightening, pressure is applied to both firmly seat tool bit 14 against surface 12 and against surface 11. In addition, the torsional affect on the head of the screw causes a movement at the neck of the screw 16 which seats the head of the screw against the entire top circumference of the aperture 16 to firmly hold the tool bit in place both against surfaces 11 and 12. The biased portion 24 of clamp screw 17 assures that very little or no portion of clamp screw 17 remains in the path of the chips being machine.

Although I have shown a specific construction and arrangement of the parts and features, I am fully cognizant of the fact that many changes may be made in the parts and features without effecting their operativeness, and I reserve the rights to make such changes as I may deem necessary or convenient, without departing from the spirit of my invention.

Having thus described my invention, what I claim and desire to secure by Letters Patent in the United States, is:

1. A tool holder arrangement for securing tool bit inserts to tool holders,
    each of said tool bit inserts having an aperture therethrough,
    said tool holder having tool bit insert receiving means,
    said tool bit insert receiving means comprising a bed at one end of said tool holder for supporting said insert thereon,
    abutment means at an end of said bed for abuttingly receiving a side of said tool bit insert to aid in positioning and supporting said tool bit insert,
    a tapped aperture extending through said bed,
    clamp screw means having a threaded section which fits through said aperture in said tool bit insert and mates with the threads in said threaded aperture,
    a head section on said clamp screw shaped to circumferentially abut the periphery of said aperture in said tool bit insert to exert a downward force around the entire aperture pressing the tool bit insert down onto said bed,
    the axis of said threaded aperture being at a first distance measured from said abutment means that is less than a second distance which is measured between the axis of the insert aperture and the side of the insert abutting the abutment means,
    said clamp screw including a neck section between said head section and said threaded section, and
    the diameter of said neck section being sufficiently small to enable the torsional force applied to the head section when said clamp screw is threaded into said threaded aperture to twist said neck section so as to seat the head section in said aperture and to apply pressure around the entire circumference of said aperture in said tool bit insert to force said tool insert towards said abutment means as well as toward the bed.

2. The tool holder arrangement of claim 1 wherein said head section has an inverted truncated conical shape, with the largest diameter being at the top portion of said head section and the smallest diameter joining the neck section,
    said inverted conical shape aiding in positioning said insert on said bed when said clamp screw is threaded into said threaded aperture.

3. The tool holder arrangement of claim 2 wherein the diameters of the threads of said threaded aperture are larger than the diameter of the threads of said clamp screw whereby said clamp screw floats in said threaded aperture to aid in aligning said tool bit insert on said bed and in exerting a force to simultaneously secure said tool bit insert against said shoulder abutment means and against said bed.

4. The tool holder arrangement of claim 3 wherein said shoulder abutment means comprises bifurcated abutment means to provide two abutment shoulders rising from said bed which said tool bit insert abuts when it is properly positioned on said bed with said clamp screw threaded into said threaded aperture and tightened against said insert.

5. The tool holder arrangement of claim 4 wherein means are provided at both ends of said clamp screw means for turning said clamp screw means to tighten said clamp screw or to loosen said clamp screw means.

6. The tool holder arrangement of claim 5 wherein the axis of said threaded aperture is perpendicular to the surface of said bed on which said tool bit insert rests.

7. The tool holder arrangement of claim 6 wherein said abutment shoulder means are parallel to the side walls of said insert and wherein the axis of the aperture of said insert is perpendicular to the surface of the bed.

* * * * *